United States Patent
Bailey, Jr. et al.

(10) Patent No.: US 9,858,551 B2
(45) Date of Patent: Jan. 2, 2018

(54) RANKING ANALYSIS RESULTS BASED ON USER PERCEIVED PROBLEMS IN A DATABASE SYSTEM

(75) Inventors: George E. Bailey, Jr., Houston, TX (US); Kurt V. Goolsbee, Spring, TX (US); Everett T. Miskelly, Houston, TX (US)

(73) Assignee: BBS TECHNOLOGIES, INC., Houston, TX (US)

( * ) Notice: Subject to any disclaimer, the term of this patent is extended or adjusted under 35 U.S.C. 154(b) by 64 days.

(21) Appl. No.: 13/225,207

(22) Filed: Sep. 2, 2011

(65) Prior Publication Data

US 2013/0060762 A1 Mar. 7, 2013

(51) Int. Cl.
  G06F 17/30 (2006.01)
  G06Q 10/10 (2012.01)
  G06F 11/34 (2006.01)
  G06Q 30/02 (2012.01)
  G06F 11/07 (2006.01)

(52) U.S. Cl.
  CPC ....... *G06Q 10/101* (2013.01); *G06F 11/3452* (2013.01); *G06F 17/30306* (2013.01); *G06Q 30/0201* (2013.01); *G06F 11/079* (2013.01)

(58) Field of Classification Search
  USPC .......................................... 707/723
  See application file for complete search history.

(56) References Cited

U.S. PATENT DOCUMENTS

| | | | |
|---|---|---|---|
| 7,107,339 B1* | 9/2006 | Wolters | H04L 41/142 709/224 |
| 8,255,516 B1* | 8/2012 | Zhang | H04L 67/10 709/203 |
| 2003/0065986 A1* | 4/2003 | Fraenkel | G06F 11/3006 714/47.2 |
| 2005/0097517 A1* | 5/2005 | Goin et al. | 717/124 |
| 2005/0222819 A1* | 10/2005 | Boss | G06Q 10/06 702/186 |
| 2007/0027985 A1* | 2/2007 | Ramany | H04L 67/125 709/224 |
| 2007/0250377 A1* | 10/2007 | Hill, Jr. | G06Q 10/00 705/7.13 |
| 2009/0089306 A1* | 4/2009 | Bhattacharjee | G06F 17/30592 |
| 2010/0142447 A1* | 6/2010 | Schlicht | H04W 4/20 370/328 |

(Continued)

Primary Examiner — Merilyn Nguyen
(74) Attorney, Agent, or Firm — Park, Vaughan, Fleming & Dowler LLP; Laxman Sahasrabuddhe

(57) ABSTRACT

Methods and systems for ranking analysis results based on user perceived problems of a database system are described. During operation, an embodiment may receive a designation of a perceived database system performance problem from a user, wherein the problem is associated with one or more database system metrics. Next, the embodiment may determine a set of recommendations for alleviating the perceived database system performance problem. The embodiment may then analyze the set of recommendations to determine, for each recommendation in the set of recommendations, an impact the recommendation is expected to have on the one or more database system metrics. Finally, the embodiment may rank the set of recommendations according to the impact each recommendation is expected to have on the perceived database performance problem.

19 Claims, 3 Drawing Sheets

(56) References Cited

U.S. PATENT DOCUMENTS

| | | | |
|---|---|---|---|
| 2010/0179987 A1* | 7/2010 | Sebastian | H04L 12/1859 709/203 |
| 2010/0306591 A1* | 12/2010 | Krishna | G06F 17/30474 714/35 |
| 2011/0022812 A1* | 1/2011 | van der Linden | G06F 9/5077 711/163 |
| 2011/0055817 A1* | 3/2011 | Noble | G06F 11/32 717/127 |
| 2011/0185011 A1* | 7/2011 | Shuman et al. | 709/203 |
| 2011/0296025 A1* | 12/2011 | Lieblich | G06F 9/5027 709/226 |
| 2012/0011439 A1* | 1/2012 | Karn | G06F 11/3414 715/704 |
| 2012/0079100 A1* | 3/2012 | McIntyre | G06F 11/0742 709/224 |
| 2013/0158950 A1* | 6/2013 | Cohen et al. | 702/176 |

* cited by examiner

US 9,858,551 B2

RANKING ANALYSIS RESULTS BASED ON USER PERCEIVED PROBLEMS IN A DATABASE SYSTEM

BACKGROUND

Technical Field

This disclosure relates to databases. More specifically, this disclosure relates to a method and an apparatus for ranking analysis results based on user perceived problems of a database system.

Related Art

Database systems are used for many mission critical applications in modern enterprises. The size and complexity of databases has grown exponentially over the past several years. It is not uncommon for an enterprise to use terabyte- or petabyte-sized databases.

Given the size and complexity of modern databases, and the fact that they are commonly used in mission critical applications, it is not surprising that database performance is often an important issue. When experiencing database performance issues, users often formulate their own ideas as to the cause of the performance issue. If analysis tools do not address the perceived problem identified by the user, then the results of the analysis will not resonate with the user and may result in decreased user satisfaction.

SUMMARY

Some embodiments described herein provide methods and systems for ranking analysis results based on user perceived problems of a database system. During operation, an embodiment may receive a designation of a perceived database system performance problem from a user, wherein the problem is associated with one or more database system metrics. The database problem may manifest itself as undesirable values (e.g., values that are outside a recommended range of values) of one or more database system metrics. The system may collect trace data and/or perform analysis of the collected trace data with a bias toward the perceived problem.

Next, the embodiment may determine a set of recommendations for alleviating the perceived database system performance problem. The embodiment may then analyze the set of recommendations to determine, for each recommendation, an impact the recommendation is expected to have on the one or more database system metrics. Finally, the embodiment may rank the set of recommendations according to the impact each recommendation is expected to have on the perceived database performance problem.

Some embodiments may provide the ranking of the set of recommendations to the user. Some embodiments may further perform, based on user input or automatically, a recommendation from the set of recommendations. Performing the recommendation from the set of recommendations may involve performing the recommendation with the highest ranking.

The database system metrics can include a memory utilization, a CPU (central processing unit) utilization, a network bandwidth, a network latency, an I/O (input/output) throughput, an I/O latency, a query execution time, or any other measurable metric that is associated with a database system performance problem.

Receiving the designation of the perceived database system performance problem from the user may involve receiving a target designation of an application, a database, a database server instance, and/or a computer system that is executing a database server instance. The set of recommendations may be determined based on the target designation. For example, if the target designation includes a database, then the set of recommendations can include creating new indexes to improve performance. Ranking the set of recommendations for alleviating the perceived database system performance problem may involve weighting the recommendations according to the target designation. For example, if the user indicated that a particular application is running slowly, then a recommendation that is not expected to affect the performance of the application may be given a lower rank than a recommendation that is expected to improve the application's performance.

DETAILED DESCRIPTION

Figure 1:
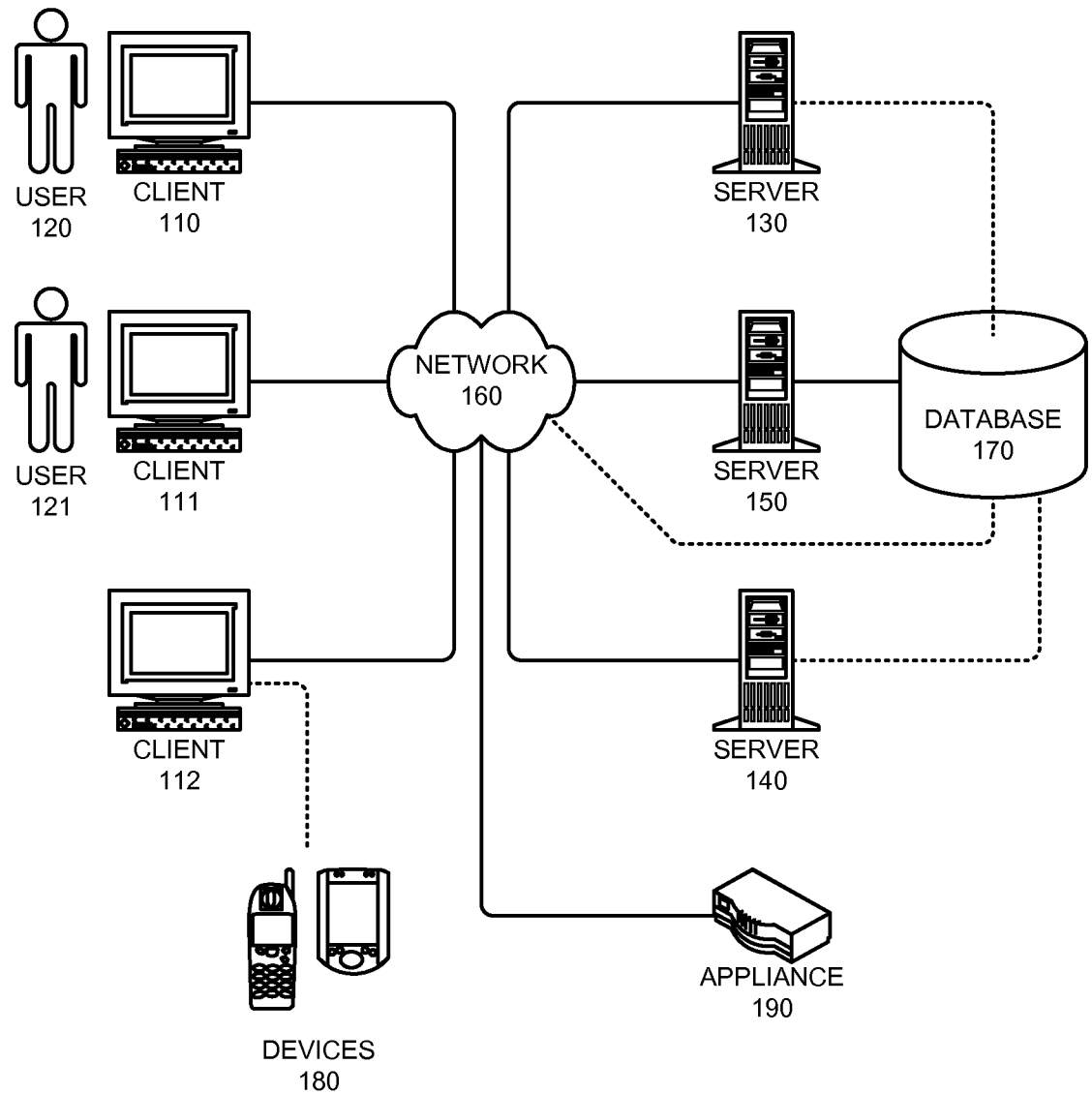
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed. Note that the term "non-transitory computer-readable storage medium" comprises all computer-readable media, with the sole exception of a propagating electromagnetic signal.

The methods and processes described in the detailed description section can be embodied as code and/or data, which can be stored on a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

Some embodiments described herein provide methods and systems for ranking analysis results based on user perceived problems of a database system. During operation, an embodiment may receive a designation of a perceived database system performance problem from a user, wherein the designation is associated with one or more database system metrics. For example, if the user indicates that database server is running slowly, then the performance metrics that are associated with this problem may include the amount of memory being used by the database server, the number of I/O operations being performed for each procedure, batch, and/or query, and the amount of processing cycles being used for each procedure, batch, and/or query.

Next, the embodiment may determine a set of recommendations for alleviating the perceived database system performance problem. The embodiment may then analyze the set of recommendations to determine an impact that each recommendation is expected to have on the one or more database system metrics. Finally, the embodiment may rank the set of recommendations according to the impact that each of the recommendations is expected to have on alleviating the perceived database system performance problem.

Note that the database system metrics can include a memory utilization, a CPU utilization, a network bandwidth, a network latency, an I/O throughput, an I/O latency, a query execution time, or any other measurable metric.

Receiving the designation of the perceived database system performance problem from the user may involve receiving a target designation of one of: an application; a database; a database server instance; a computer system that is executing the database server instance and/or the application; or an operating system on the computer system that is executing the database server instance and/or the application. Determining and/or ranking the set of recommendations for alleviating the perceived database system performance problem may involve using the target designation for guidance.

For example, the user may notice that the entire server is running slowly, or may notice that a particular query or application process is taking an inordinate amount of time to execute. In this example, the user may designate an area of concern. In response, for purposes of ranking recommendations, an embodiment may assign a higher weight to the system metrics directly related to the problem designated by the user.

Computing Environment

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes clients 110-112, users 120 and 121, servers 130-150, network 160, database 170, devices 180, and appliance 190.

Clients 110-112 can include any node on a network including computational capability and including a mechanism for communicating across the network. Additionally, clients 110-112 may comprise a tier in an n-tier application architecture, wherein clients 110-112 perform as servers (servicing requests from lower tiers or users), and wherein clients 110-112 perform as clients (forwarding the requests to a higher tier).

Similarly, servers 130-150 can generally include any node on a network including a mechanism for servicing requests from a client for computational and/or data storage resources. Servers 130-150 can participate in an advanced computing cluster, or can act as stand-alone servers. In one embodiment of the present invention, server 140 is an online "hot spare" of server 150.

Users 120 and 121 can include: an individual; a group of individuals; an organization; a group of organizations; a computing system; a group of computing systems; or any other entity that can interact with computing environment 100.

Network 160 can include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled: to a server (such as server 150), to a client, or directly to a network.

According to one definition, (1) a database is an organized collection of data; (2) a database server is a computer program that executes on a computer system, and which provides access to one or more databases based on a client-server model; and (3) a database system comprises, among other things, one or more databases, one or more database servers, and one or more computer systems on which the one or more database servers execute.

Devices 180 can include any type of electronic device that can be coupled to a client, such as client 112. This includes, but is not limited to, cell phones, personal digital assistants (PDAs), smartphones, personal music players (such as MP3 players), gaming systems, digital cameras, video cameras, portable storage media, or any other device that can be coupled to the client. Note that, in some embodiments of the present invention, devices 180 can be coupled directly to network 160 and can function in the same manner as clients 110-112.

Appliance 190 can include any type of appliance that can be coupled to network 160. This includes, but is not limited to, routers, switches, load balancers, network accelerators, and specialty processors. Appliance 190 may act as a gateway, a proxy, or a translator between server 140 and network 160.

Note that different embodiments of the present invention may use different system configurations, and are not limited to the system configuration illustrated in computing environment 100. In general, any device that is capable of communicating via network 160 may incorporate elements of the present invention.

System

Figure 2:
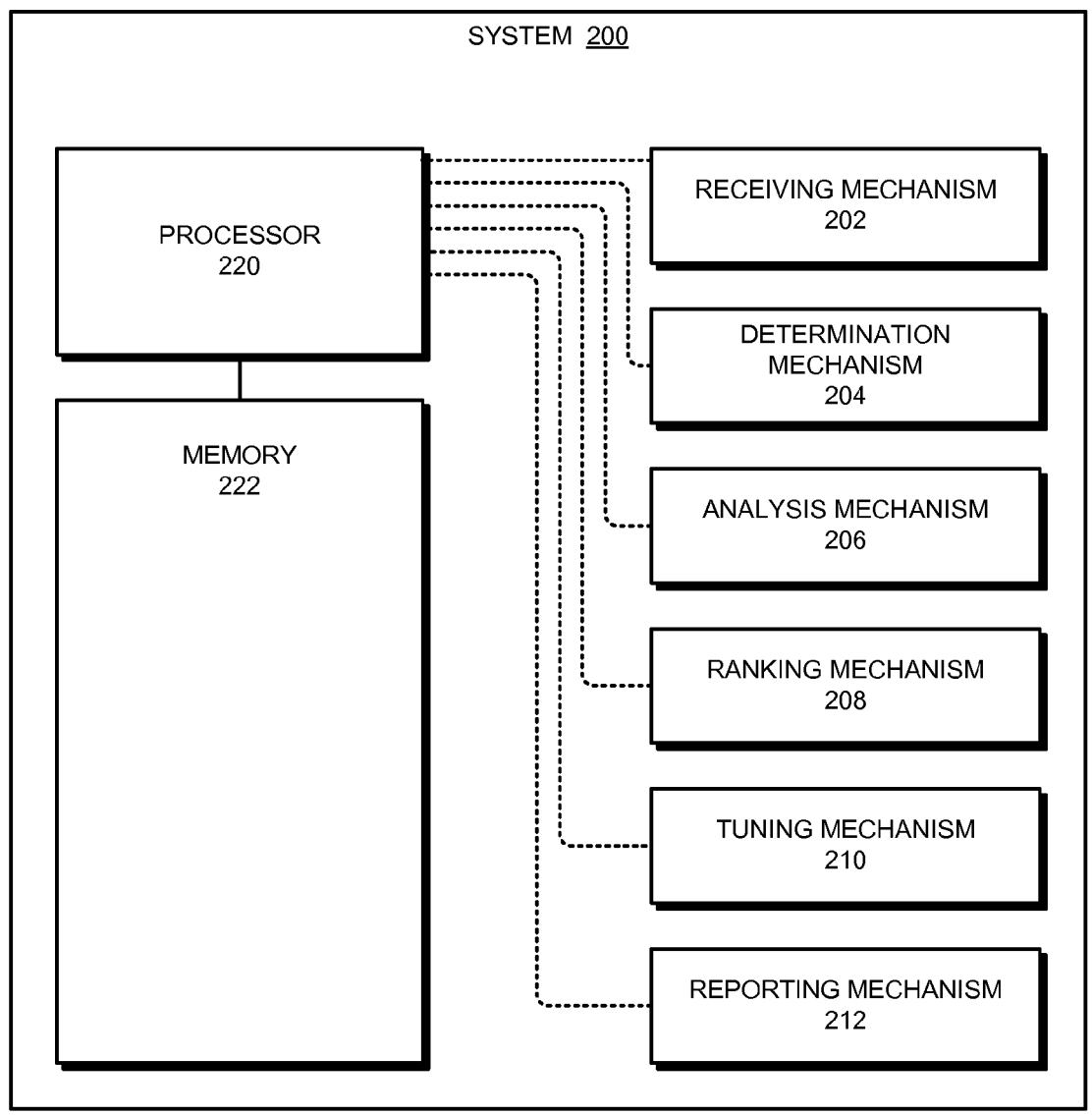
FIG. 2 illustrates a system in accordance with an embodiment of the present invention.

FIG. 2 illustrates a system 200 in accordance with an embodiment of the present invention. As illustrated in FIG. 2, system 200 can comprise server 150, database 170, appliance 190, client 110, devices 180, or any combination thereof. System 200 can also include receiving mechanism 202, determination mechanism 204, analysis mechanism 206, ranking mechanism 208, tuning mechanism 210, reporting mechanism 212, processor 220, and memory 222.

The various mechanisms shown in FIG. 2 can be realized using hardware or a combination of hardware and software. For example, embodiments of these mechanisms include, but are not limited to, application-specific integrated circuit (ASIC) chips, field-programmable gate arrays (FPGAs), and other programmable-logic devices now known or later developed.

Ranking Analysis Results Based on User Perceived Problems

Figure 3:
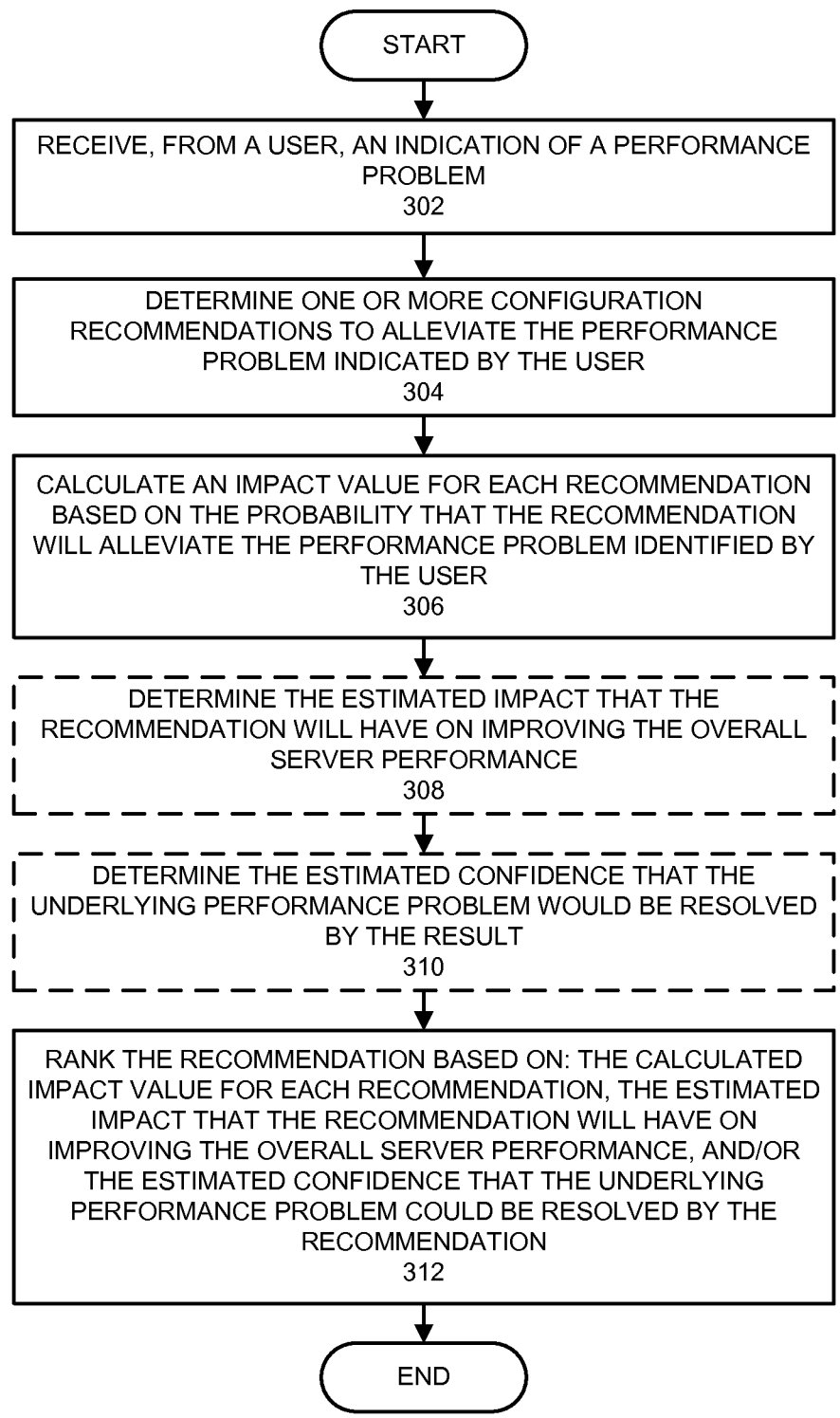
FIG. 3 presents a flow chart illustrating the process of ranking analysis results based on user perceived problems of a database system in accordance with an embodiment of the present invention.

FIG. 3 presents a flow chart illustrating the process of ranking analysis results based on user perceived problems of a database system in accordance with an embodiment of the present invention.

The process can begin with a system (e.g., server 150) receiving, from a user (e.g., user 120), an indication of a performance problem (operation 302). For example, the user may notice that, on a database system, the utilization of the processor, memory, I/O subsystem, and/or network subsystem is greater than a desirable level. Another example of a performance problem may be that a particular application or a database server instance is processing requests more slowly than a desired speed (i.e., the request processing latency is greater than a threshold).

Specifically, in some embodiments, the system can provide a questionnaire or a list of options to the user that enables the user to identify the type of problem that is being experienced. For example, the system provides the following three options to the user: (1) a database server is running slowly, (2) an application is performing poorly, and (3) the database is performing poorly (e.g., the user may be experiencing large query processing latencies that involve a particular set of tables in a database). The system may allow the user to select one or more options from this list.

The system may then analyze the database system. Specifically, the system may collect trace data and/or perform analysis of the collected trace data with a bias toward the perceived problem. For example, if the perceived problem involves a particular database server running slowly, then the system can collect trace data that is associated with hardware and/or operating system parameters of the computer system that is executing the database server. Further, while analyzing the trace data, the system may try to identify recommendations that are specifically designed to alleviate the perceived problem at the cost of possibly degrading database system performance metrics that are not associated with the perceived problem.

Once the trace data has been collected and analyzed, the system can determine one or more configuration recommendations to alleviate the performance problem indicated by the user (operation 304). For example, if the user indicated that a database server was experiencing high memory usage, then the system can concentrate on making recommendations for reducing memory consumption. Likewise, if the user indicated that a particular query was taking an inordinate amount of time to execute, the system could create recommendations designed around reducing the query execution time.

Once the one or more recommendations have been determined, the system ranks the recommendations with a bias toward the performance problem identified by the user. Note that in some embodiments the performance problem identified by the user may not be the most significant performance problem that the system is facing. That is why it is important to allow the user to specify the perceived performance problem instead of trying to automatically identify the performance problem based on determining whether or not a given database system performance metric is within a target range of values.

Specifically, the system can calculate an impact value for each recommendation based on the probability that the recommendation will alleviate e the performance problem identified by the user (operation 306).

In some embodiments, the system determines the estimated impact that the recommendation will have on improving the overall database system performance (operation 308), and the estimated confidence that the underlying performance problem could be resolved by the recommendation (operation 310). Note that operations 310 and/or 312 are optional and one or both of them may not be performed in some embodiments.

Finally, in some embodiments, the system ranks the recommendations based on: the calculated impact value based on the probability that the recommendation will alleviate the performance problem identified by the user, the estimated impact that the recommendation will have on improving the overall server performance, and/or the estimated confidence that the underlying performance problem could be resolved by the recommendation (operation 312).

Note that the specific technique for ranking recommendations can vary from one embodiment to the next. For example, in some embodiments, the system may assign three different impact scores: one based on the probability that the recommendation will alleviate the performance problem identified by the user, one based on the estimated impact that the recommendation will have on improving the overall server performance, and one based on the estimated confidence that the underlying performance problem could be resolved by the recommendation. Next, the system may determine an overall impact score for the recommendation by computing a weighted sum of the individual impact scores. In other embodiments, the system can use a set of rules to rank the recommendations (e.g., if the aggregate impact score of a set of recommendations is the same or is substantially the same, then the recommendations that are easier to implement may be ranked higher than the other ones). In some embodiments, administrators may be able to vary and/or specify the parameters (e.g., impact score weighting, the rules) that affect the ranking of the recommendations.

Once the recommendations have been ranked, the system can present the recommendations with their rankings to the user. The user can then select one or more recommendations based on the list, and in response, the system may perform actions consistent with the selected recommendations. In some embodiments, the system may allow the user to instruct the system to automatically perform highly ranked recommendations.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for ranking analysis results based on user perceived problems of a database system, the method comprising:

receiving, from a user, an indication regarding a user-perceived database system performance problem, wherein the indication is associated with one or more database system metrics, and wherein the user-perceived database system performance problem is not determined based on whether or not a database system metric is within a target range of values;

analyzing the one or more database system metrics, wherein the analyzing is based on the user-perceived database system performance problem;

determining, by computer, a set of recommendations for alleviating the user-perceived database system performance problem at cost of degrading at least one of the one or more database system metrics that are not associated with the user-perceived database system performance problem;

analyzing the set of recommendations to determine, for each recommendation, an impact the recommendation is expected to have on the user-perceived database system performance problem based on an impact the recommendation is expected to have on the one or more database system metrics; and ranking the set of recommendations according to the impact each recommendation is expected to have on the user-perceived database system performance problem.

2. The computer-implemented method of claim 1, further comprising performing a recommendation from the set of recommendations.

3. The computer-implemented method of claim 2, wherein performing the recommendation from the set of recommendations involves performing the recommendation with a highest ranking.

4. The computer-implemented method of claim 1, further comprising providing the ranking of the set of recommendations to the user.

5. The computer-implemented method of claim 1, wherein the database system metrics can include:
   a memory utilization;
   a CPU utilization;
   a network bandwidth;
   a network latency;
   an I/O throughput;
   an I/O latency; and
   a query execution time.

6. The computer-implemented method of claim 1, wherein receiving the indication of the user-perceived database system performance problem from the user further involves receiving a target designation of one of:
   an application;
   a database server instance; or
   a computer system that is executing the database server instance.

7. The computer-implemented method of claim 6, wherein ranking the set of recommendations for alleviating the user-perceived database system performance problem involves weighting the recommendations according to the target designation.

8. A non-transitory computer-readable storage medium storing instructions that, when executed by a computer, cause the computer to perform a method for ranking analysis results based on user perceived problems of a database system, the method comprising:
   receiving, from a user, an indication a user-perceived database system performance problem, wherein the indication is associated with one or more database system metrics, and wherein the user-perceived database system performance problem is not determined based on whether or not a database system metric is within a target range of values;

analyzing the one or more database system metrics, wherein the analyzing is based on the user-perceived database system performance problem;

determining a set of recommendations for alleviating the user-perceived database system performance problem at =cost of degrading at least one of the one or more database system metrics that are not associated with the user-perceived database system performance problem;

analyzing the set of recommendations to determine, for each recommendation, an impact the recommendation is expected to have on the user-perceived database system performance problem based on an impact the recommendation is expected to have on the one or more database system metrics; and ranking the set of recommendations according to the impact each recommendation is expected to have on the user-perceived database system performance problem.

9. The non-transitory computer-readable storage medium of claim 8, wherein the method further comprises performing a recommendation from the set of recommendations.

10. The non-transitory computer-readable storage medium of claim 9, wherein performing the recommendation from the set of recommendations involves performing the recommendation with <, highest ranking.

11. The non-transitory computer-readable storage medium of claim 8, wherein the method further comprises providing the ranking of the set of recommendations to the user.

12. The non-transitory computer-readable storage medium of claim 8, wherein the database system metrics can include:
   a memory utilization;
   a CPU utilization;
   a network bandwidth;
   a network latency;
   an I/O throughput;
   an I/O latency; and
   a query execution time.

13. The non-transitory computer-readable storage medium of claim 8, wherein receiving the indication of the user-perceived database system performance problem from the user further involves receiving a target designation of one of:
   an application;
   a database server instance; or
   a computer system that is executing the database server instance.

14. The non-transitory computer-readable storage medium of claim 13, wherein ranking the set of recommendations for alleviating the user-perceived database system performance problem involves weighting the recommendations according to the target designation.

15. An apparatus configured for ranking analysis results based on user perceived problems of a database system, comprising:
   a memory;
   a processor;
   a receiving mechanism configured to receive, from a user, an indication regarding a user-perceived database system performance problem, wherein the indication is associated with one or more database system metrics, and wherein the user-perceived database system performance problem is not determined based on whether or not a database system metric is within a target range of values;

analyzing the one or more database system metrics, wherein the analyzing is based on the user-perceived database system performance problem;

a determination mechanism configured to determine a set of recommendations for alleviating the user-perceived database system performance problem at a cost of degrading at least one of the one or more database system metrics that are not associated with the user-perceived database system performance problem;

an analysis mechanism configured to analyze the set of recommendations to determine, for each recommendation, an impact the recommendation is expected to have on the user-perceived database system performance problem based on an impact the recommendation is expected to have on the one or more database system metrics; and a ranking mechanism configured to rank the set of recommendations according to the impact each recommendation is expected to have on the user-perceived database system performance problem.

16. The apparatus of claim 15, further comprising a tuning mechanism configured to perform a recommendation from the set of recommendations.

17. The apparatus of claim 16, wherein the tuning mechanism is further configured to perform the recommendation with highest ranking.

18. The apparatus of claim 15, further comprising a reporting mechanism configured to provide the ranking of the set of recommendations to the user.

19. The apparatus of claim 15, wherein the receiving mechanism is further configured to receive a target designation of one of:
  an application;
  a database server instance; or
  a computer system that is executing the database server instance.

* * * * *